J. A. BIRSFIELD.
ELECTRICAL PROTECTIVE APPARATUS.
APPLICATION FILED MAR. 13, 1906. RENEWED JULY 18, 1907.
970,169.
Patented Sept. 13, 1910.
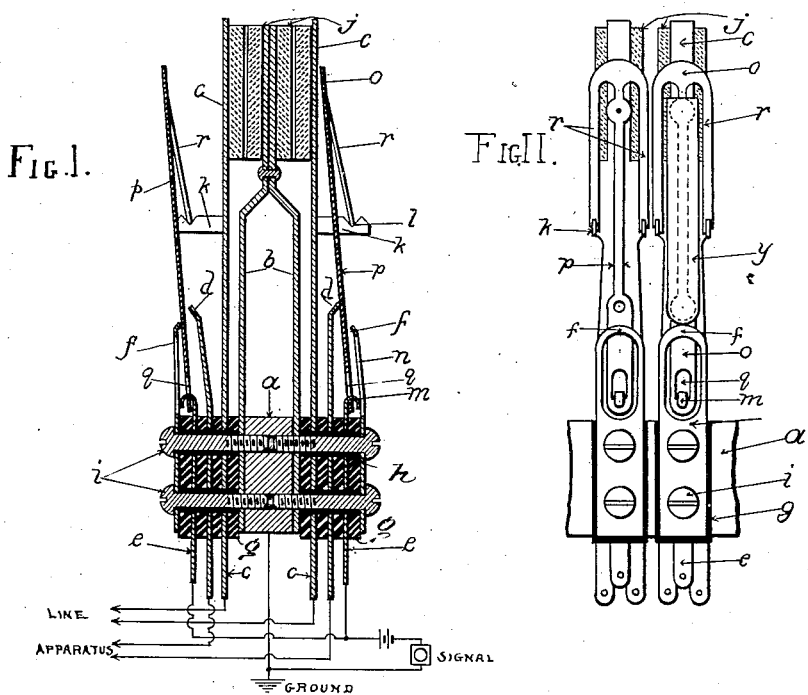
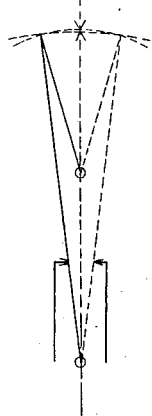 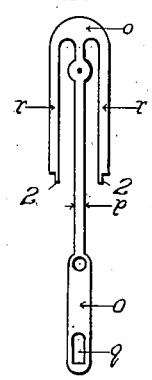 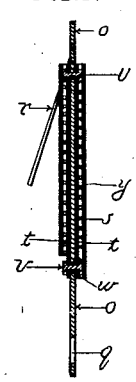 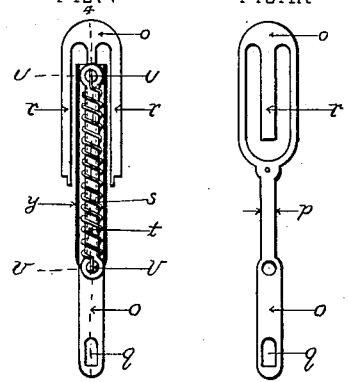 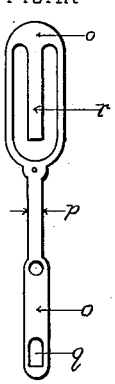
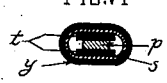  
WITNESSES:
INVENTOR.
BY
ATTORNEY.

UNITED STATES PATENT OFFICE.

JULES A. BIRSFIELD, OF ROCHESTER, NEW YORK, ASSIGNOR TO CHARLES A. BROWN AND LYNN A. WILLIAMS, OF CHICAGO, ILLINOIS, A COPARTNERSHIP.

ELECTRICAL PROTECTIVE APPARATUS.

970,169.  Specification of Letters Patent.  Patented Sept. 13, 1910.

Application filed March 13, 1906, Serial No. 305,876. Renewed July 18, 1907. Serial No. 384,414.

*To all whom it may concern:*

Be it known that I, JULES A. BIRSFIELD, citizen of the United States, residing at Rochester, in the county of Monroe and State of New York, have invented certain new and useful Improvements in Electrical Protective Apparatus, of which the following is a specification.

My invention relates to electric protective devices in general and is particularly adaptable for telegraph, telephone, or other low current electrical circuits, and has for its object the protection of such circuits and apparatus from high tension electrical charges and discharges, such as lightning, also the more dangerous sneak currents resulting from the accidental crossing of electrical conductors of high voltage, and is characterized by simplicity, cheapness of construction and accuracy of operation.

My invention also provides in combination with a lightning arrester, which may consist of carbon blocks and interposed dielectrics, a thermal device depending for its operation upon the expansion of a solid body, or the unequal expansion of two members of a solid body, preferably of metal, and is adaptable for various conditions as circumstances may demand.

It is to be understood that within the purview of the invention various changes in the form, proportions and minor details and modifications of the constructional arrangement of spring conductors, supports and the thermal devices may be resorted to without departing from the nature of my invention.

The several drawings illustrating my invention are as follows:

Figure 1 is a vertical transverse section of a duplicate set of protective apparatus mounted on opposite sides of a supporting strip, the right hand apparatus illustrating the relative arrangement of the parts under normal conditions and the left hand apparatus showing the positions assumed by the parts when operated by the passage of an abnormal current, the same being grounded by the operations of the apparatus serving to complete the signal or alarm circuit. Fig. 2 is a front view of a pair of protective devices mounted side by side, one being equipped with a plain thermal device and the other having a coil thermal device. Fig. 3 is a detail view in elevation of the plain thermal element. Fig. 4 is a vertical section of the thermal element provided with a coil, such section being taken along the line 4, 4 of Fig. 5. Fig. 5 is a front view of a thermal element provided with a coil and a protecting tube, the latter being in section. Fig. 6 is a horizontal section of the parts shown in Fig. 5 taken about on the plane of the characters $y$ and $s$. Fig. 7 is a view similar to Fig. 6 taken about on the plane of the member $u$, Fig. 5. Fig. 8 is a similar view taken about on the plane of the member $v$, Fig. 5. Fig. 9 is a front view of a modified form of thermal element. Fig. 10 is a diagrammatic view showing the relations that the parts of the thermal elements sustain to each other by virtue of which they are adapted to perform the functions described.

Referring to Figs. 1 and 2, the assembled apparatus as shown consists in a bar $a$, to which plates $b$, one on either side, are secured. To this bar $a$ are also secured on each side thereof conducting spring $c$ and contact spring $d$, insulated therefrom and from each other, and contact spring $f$ insulated from the other springs but electrically connected with the bar $a$, as will appear. Between the springs $d$ and $f$ on each side of the bar $a$ a terminal $e$ is located insulated from the springs $d$ and $f$ and also from the bar $a$. The springs mentioned are secured together and to the bar $a$ by means of suitable screws $i$, as indicated, which screws pass through the springs and terminal plates, being insulated from the springs $c$, $d$ and the terminal $e$ by suitable insulating sleeves $h$, as indicated. The plates $b$ are in electrical contact with the bar $a$ as are also the springs $f$ by way of the screws $i$.

Each spring $c$ is extended so as to support between it and the coöperating plate $b$ a pair of carbon blocks $j$ normally separated by a thin layer of suitable dielectric material, serving to prevent contact between the carbon blocks and yet not separate them so far as to prevent a high voltage discharge from jumping the gap between the blocks. The spring $c$ carries two arms $k$, conveniently stamped therefrom, each having a notch $l$ formed in its outer end. The terminal $e$ has formed upon its upper end a hook $m$ adapted to engage the opening $q$ formed in the lower end of the thermal element $p$. This thermal element is adapted to occupy either of two positions, as shown in Fig. 1, the position shown for the right hand apparatus being the normal position, while the position shown in the left hand apparatus is the position after the device has been operated. The element $p$ is so disposed between the contact springs $d$ and $f$ and these springs are so conformed that when the element is in its normal position it is in contact with the spring $d$, and when it is in its operated position it is in contact with the spring $f$.

The thermal element, as shown in Figs. 1 and 2, consists in a narrow thin strip of conducting material possessing a high coefficient of expansion, and upon this strip, legs or struts $r$ are formed, one on either side of such strip, these struts extending substantially in the same direction as the central strip. The lower ends of the legs $r$ are notched, as indicated, at 2, 2 to engage the notches $l$, $l$ formed in the outer ends of the arms $k$, $k$, with which the thermal element is adapted to coöperate, these legs being primarily bent so that the thermal element tends to assume the position shown in the left hand apparatus in Fig. 1. The narrow projecting ends 2, 2 of the legs $r$, $r$ serve to prevent lateral displacement of the thermal device relatively to the supporting arms $k$, $k$. The thermal element is so designed relatively to the arrangement of the arms $k$, $k$ and the terminal $e$ that the legs $r$, $r$ are just a little too long to permit moving the thermal element from one position to the other without slightly bending the spring $c$, which supports the legs $r$, $r$. On account of the resilience of the spring $c$, however, the thermal element may be moved from its operated position to its normal position by pressing the upper end of the thermal element in toward the spring $c$. This results in bringing the upper end of the thermal element near or into contact with the spring $c$ and also places the legs $r$, $r$ under a sufficient tension so that when the thermal element is expanded by the application of heat in a manner to be described, such element will be moved outward and assume the position indicated in the left hand apparatus in Fig. 1. As a result of the proportions of the several parts just described, it follows that when the thermal element is moved to its normal position the action of the legs $r$ exerts a tension upon the thermal element $p$, which, however, is not sufficient to cause any change in the form or position of such element.

The several springs above described are adapted to be connected, as shown in Fig. 1, as follows: The springs $c$, $c$ are adapted to be connected to the line supplying the energy for operating the apparatus. The springs $d$, $d$ are adapted to be connected to the apparatus to be protected. The terminals $e$, $e$ are adapted to be connected in a local circuit for signaling purposes, and the plates $b$, $b$ and springs $f$, $f$ are connected together and grounded. From the connections just described it will be observed that with the thermal elements in their normal position on both sides, the circuit from the line will extend first through one spring $c$, the coöperating thermal element $p$, the spring $d$ with which it is in contact, to and through the apparatus, and returning from the apparatus to the other spring $d$, the thermal element $p$ in contact therewith, the associated spring $c$ back to line. As a result of the springs $c$ being in contact with the lightning arrester blocks $j$, which in turn are connected through the plates $b$, $b$ to ground, a convenient path is afforded for the dissipation of high voltage discharges that may strike the line. Furthermore, since the current flowing through the apparatus passes through the central strips of the thermal elements, which strips are designed as to their resistance so as to be heated by such current flow, when this current becomes abnormal the thermal elements are sufficiently expanded to permit the resilience of the legs $r$, $r$ to throw the thermal elements from their normal position to their operated position, thus breaking contact with the springs $d$, $d$ and making contact with the springs $f$, $f$. As a result of this it will be noticed that the line connection to the apparatus is opened at both springs $d$ and that a local signaling circuit is closed from battery through the terminal $e$, the thermal element $p$, spring $f$, screw $i$, bar $a$, back to and through the signal and thus back to the battery, as indicated. As this apparatus is ordinarily used, large numbers of protective sets are mounted upon a common supporting bar $a$, and as a result the thermal elements $p$ lie in practically the same plane longitudinally of the bar $a$ when such elements are in their normal position. When, however, an abnormal current has operated one of the thermal elements, by assuming its operated position, it is removed from such plane and is therefore readily observable by an attendant, who can thus locate the line upon which trouble may exist. As already indicated, the operated thermal element may be moved back to its normal position by simply pressing its upper end toward spring $c$, the resilience of the supporting parts being sufficient to allow this motion.

As shown in Figs. 4 and 5 and the sectional view relating thereto, the normal element may in some cases preferably be constructed by surrounding the central strip with a coil $s$, insulated from such strip and connected at its ends by means of fastening devices $u$, $v$, the fastening device $u$ being in contact with the strip $p$, while the fastening device $v$ is insulated from such strip and adapted to make contact with the spring $d$, when the thermal element is in its normal position. The coil $s$ is preferably inclosed in a tube $y$ of insulating material, to protect the coil and prevent the dissipation of the heat produced by such coil.

As a result of the construction just described, when this modification of my thermal element is in its normal position, the current flows through the coil $s$ and thus when increased to an abnormal amount as a result of the heat generated in the coil, heats the thermal element $p$ sufficiently to cause the thermal device to operate in a manner already described.

In Fig. 9 a modified form of thermal element is shown, in which the strip of comparatively high resistance, $p$, is split into two portions, and but one leg or strut $r$ is used in connection therewith, such leg lying between the two portions of the strip $p$.

While I have shown my invention in the particular embodiment herein described, I do not, however, limit myself to this construction, but desire to claim broadly any equivalent modification that will suggest itself to those skilled in the art.

What I claim is:

1. In protective apparatus of the character specified, the combination of a ground and a line spring, a lightning arrester interposed between said springs, a second ground spring electrically connected with the first mentioned ground spring, an apparatus spring, the line and apparatus springs being insulated from each other and from the ground springs, and a thermal device arranged to operate between the apparatus spring and the second ground spring and normally in electrical connection with the apparatus spring.

2. In protective apparatus of the character specified, the combination of a ground and a line spring, a lightning arrester interposed between said springs, a second ground spring electrically connected with the first mentioned ground spring, an apparatus spring, the line and apparatus springs being insulated from each other and from the ground springs, and a thermal device arranged to operate between the apparatus spring and the second ground spring, said thermal device comprising a body portion and a supporting leg, the latter being normally under tension and serving upon elongation of the body portion to interrupt the apparatus circuit and to establish the ground circuit.

3. In protective means for electrical apparatus, the combination of a line spring, an apparatus spring and a ground spring, the several springs being electrically insulated from one another, and a thermal device arranged to operate between the apparatus spring and the ground spring and normally in electrical connection with the apparatus spring and comprising a slender body portion and a supporting leg, the latter having electrical connection with the line spring and normally deflected from a given position to place it under lateral tension and adapted upon elongation of the said body portion to regain its normal position and interrupt the apparatus circuit and close the ground circuit.

4. In apparatus of the character set forth, the combination of a line spring having a support, an apparatus spring and a ground spring, the several springs being electrically insulated from one another, and a thermal device comprising a body portion and a spring member, the latter being mounted upon the support of the line spring and normally deflected from a given position to place it under lateral tension and serving upon expansion of the said body portion to regain its normal position and interrupt the circuit through the apparatus and to ground the line.

5. In apparatus of the character described, the combination of a line spring, an apparatus spring, an alarm spring and a ground spring, the several springs being electrically insulated from one another, a thermal device having electrical connection with the alarm spring and with the line spring and normally in contact with the apparatus spring and comprising a body and a supporting member which normally are under lateral tension and are adapted to have their relative position changed upon the passage of a current of high voltage to interrupt and ground the circuit through the apparatus and to simultaneously close the signal or alarm circuit.

6. In a device of the character set forth, the combination of a line spring, an apparatus spring, an alarm spring and a ground spring, the several springs being electrically insulated from one another, and a thermal device supported by means of a line spring and comprising a leg and a body portion, the latter having loose connection with the alarm spring and normally closing the circuit through the apparatus, and the said leg being deflected from a given position to place it under lateral tension and adapted upon expansion of the said body portion by the passage of a current of high voltage therethrough, to regain a normal position to interrupt the circuit through the apparatus and to ground the line, and at the same time to close the signal, or alarm, circuit.

7. In apparatus of the character set forth, the combination of a line spring having a support provided with a seat, an apparatus and a ground spring, and a thermal device and comprising a spring leg having its free end fitted in the seat of the support of the line spring.

8. In a device of the character set forth, the combination of the following electrically insulated springs, a line, an apparatus, an alarm and a ground spring, the latter having an opening or cut away portion, and a thermal device jointed to the alarm spring about opposite to the opening of the ground spring and supported upon the line spring and normally in electrical connection therewith and with the apparatus spring.

9. In apparatus of the character set forth, the combination of a series of electrically insulated springs designated as line apparatus, alarm and ground springs, a thermal device coöperating with said springs and comprising a body portion, and a coil surrounding said body portion and electrically connected therewith at one end and insulated therefrom at the opposite end which is normally in electrical connection with the apparatus spring, the heat developed by the resistance of the thermal coil through the passage of a current of high voltage therethrough serving to effect expansion of the thermal device to interrupt and ground the apparatus circuit and to close the alarm circuit.

10. In apparatus of the character set forth, the combination of a series of electrically insulated springs designated as line apparatus, alarm and ground springs, a thermal device coöperating with said springs and comprising a body portion, and a coil surrounding said body portion and electrically connected therewith at one end and insulated therefrom at the opposite end which is normally in electrical connection with the apparatus spring, the heat developed by the resistance of the thermal coil through the passage of a current of high voltage therethrough serving to effect expansion of the thermal device to interrupt and ground the apparatus circuit and to close the signal or alarm circuit closed, and a tube enveloping said thermal coil and protecting the same.

11. In apparatus of the character set forth, the combination of a series of electrically insulated springs designated as line apparatus, alarm and ground springs, a thermal device coöperating with said springs and comprising a body portion, and a coil surrounding said body portion and electrically connected therewith at one end and insulated therefrom at the opposite end which is normally in electrical connection with the apparatus spring, the heat developed by the resistance of the thermal coil through the passage of a current of high voltage therethrough serving to effect expansion of the thermal device to interrupt and ground the apparatus circuit and to close the signal or alarm circuit closed, and strips of insulating material interposed between the coil and the body portion of the thermal device encircled thereby.

12. Protective means for electrical apparatus, the same comprising a ground and a line spring, the latter having an off-standing support, a lightning arrester interposed between the ground and line springs, an apparatus spring, an alarm spring, and a second ground spring, and a thermal device comprising a body portion and a leg, the latter being mounted upon the support of the line spring and the body portion being jointed to the alarm spring, said thermal device being normally under tension and in electrical connection with the line apparatus and alarm springs and adapted upon the passage of a current of high voltage to interrupt the circuit through the apparatus, ground the line and close the alarm or signal circuit.

13. An electrical protective apparatus comprising a series of two conductor springs, a support therefor, said springs being insulated from each other, and a thermal device normally in circuit with one of said conductor springs and comprising a spring leg and a body portion, and a coil surrounding the said body portion and normally included in the circuit, whereby upon the passage of an abnormal current through the said body portion and the coil, the body portion of the thermal device elongating by the developed heat, breaks the normal circuit and establishes the circuit through the other of the aforesaid conductor springs.

14. In an electric protective device, the combination of switch contacts, a conducting detaining member subject to expansion and contraction dependent upon the strength of the current flowing therein and serving normally to maintain one contact condition, and a spring integral with said detaining member for changing contact conditions operative upon the expansion of said detaining member due to the flow of an abnormal current therein.

15. In combination, an electric circuit, switching mechanism connected in said circuit, said switching mechanism including a detaining member subject to expansion and contraction dependent upon the strength of the current flowing therein and serving normally to maintain said switching mechanism in one of its alternative conditions, and a source of power for actuating said detaining member operative to open the circuit upon the expansion of said detaining member due to the flow of abnormal current therein, and a contact member for only electrical engagement with said detaining member.

16. In combination, an electro-thermal device, and electrical switching mechanism held against spring tension on one side of a critical intermediate position by said electro-thermal device, the expansion of said electro-thermal device, due to the passage of an abnormal current, serving to release said switching mechanism.

17. In combination, an electric circuit, an electro-thermal device connected in said circuit, electrical switching mechanism included in said circuit and having a normal position, an alternate position, and a critical intermediate position, said electro-thermal device serving to retain said switching mechanism in its normal position, and spring mechanism tending to move said switching mechanism from its normal to its alternate position when released by the expansion of said electro-thermal device due to the flow of an abnormal current therein.

18. In combination, a swinging arm, a tension member adapted normally to retain said arm on whichever side of a critical intermediate position it may lie, means tending to move said swinging arm from its normal to its alternate side of said intermediate position, an electro-thermal device adapted to change the length of one of said members upon the flow of an abnormal current, thereby releasing said swinging arm from its normal position and permitting it to swing into its alternate position, and switch contacts controlled by said members.

19. In combination, an electric circuit, a swinging arm, a tension member adapted normally to retain said swinging arm on whichever side of a critical intermediate position it may lie, means tending to move said swinging arm from its normal position on one side of said intermediate position to its alternate position on the other side of the intermediate position, an electro-thermal device included in said circuit and adapted to heat and thereby increase the length of the tension member upon the passage of a strong current through said circuit, the extension of said tension member serving to permit the movement of said swinging arm through the critical intermediate position, and switch contacts controlled by said members, said switch contacts serving normally to maintain the closure of said circuit.

20. In combination, an electric circuit, a swinging arm, a tension member adapted normally to retain said arm on whichever side of a critical intermediate position it may lie, an electro-thermal device in said circuit for heating and thereby increasing the length of said tension member upon the flow of a strong current in said circuit, means tending to move said swinging arm from its normal position to an abnormal position on the other side of the intermediate position, the expansion of said tension member serving to permit such movement of the swinging arm, and means for breaking the circuit through said electro-thermal device upon the passage of said critical intermediate position.

21. In combination, two pivoted arms connected together at their free ends, means tending to move the free ends of said arms from the normal to the abnormal side of the straight line through the pivots of said arms, switch contacts controlled by said arms, and an electro-thermal device for changing the length of one of said arms upon the passage of an abnormal current.

22. In combination, a sheet metal stamping formed into two pivoted arms, one a tension member, and the other a compression member, connected together at their free ends, said stamping having an initial set whereby the resiliency of said stamping tends to swing the free ends of said arms from the normal to the abnormal side of the straight line passing through the pivots of said arms, an electro-thermal device for heating and thereby increasing the length of one of said arms upon the flow of an excessively strong current therein, normally closed switch contacts included in circuit with said electro-thermal device, and means whereby the movement of said pivoted arms from the normal to an abnormal position will actuate said switch contacts to open the circuit through the electro-thermal device.

23. In combination, a short arm and a long arm, both of said arms being pivoted at one end and the free ends of said arms being connected together, means tending to swing the free ends of said arms from the normal side to the abnormal side of a straight line passing through the pivots of said arms, an electro-thermal device for increasing the length of the long arm due to the flow of a strong current of electricity, the increased length of said arm being sufficient to permit the free ends of said arms to swing from the normal side to the abnormal side of said straight line, and switch contacts adapted to be actuated upon such movement of said arms.

24. In an electric protective device, in combination, a conductive thermal member, a contact spring normally having only electrical engagement with said member, and a source of power mechanically restrained by said thermal member but effective upon expansion of said member due to current flowing therein to disengage said member from said contact spring to open the circuit at that point.

25. In an electric protective device, in combination, contact springs, a conductive thermal member operating between said springs, and a source of power effective upon expansion of said member due to current flowing therein to move said member out of contact with one of said springs and into contact with the other.

26. In an electric protective device, in combination, a hinged thermal member adapted to occupy two positions, a hinged spring member tending to hold said thermal member in one of said positions, said thermal member when of normal length preventing action of said spring member and holding itself in the other of said positions and when expanded due to current flowing therein permitting action of said spring member, and a contact member for engagement with said thermal member.

In testimony whereof I affix my signature in presence of two witnesses.

JULES A. BIRSFIELD.

Witnesses:
EDWARD G. GRIBBROEK,
ISAAC DE MALLIE.